Figure 1:
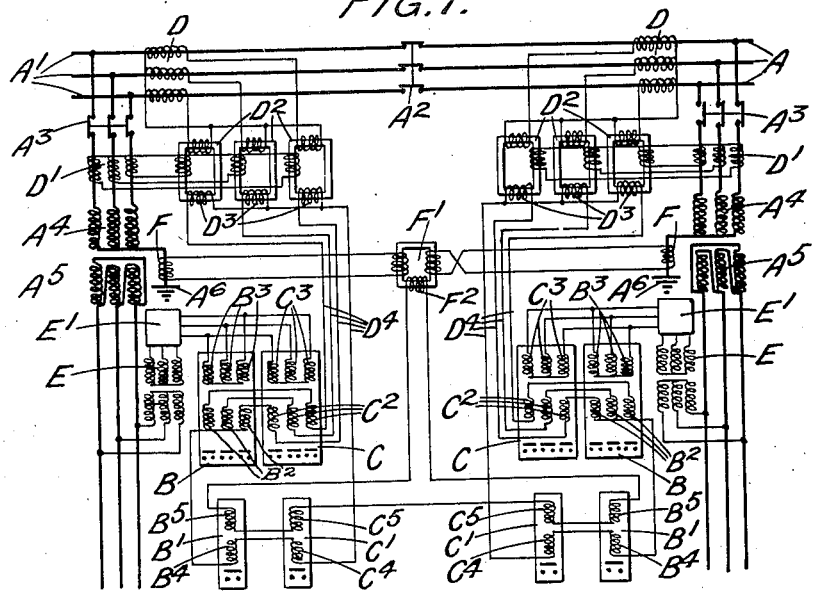

June 24, 1930.   E. W. M. SCOTT ET AL   1,765,887
PROTECTIVE ARRANGEMENT FOR SECTIONALIZED ELECTRIC POWER CIRCUITS
Filed Feb. 27, 1929   4 Sheets-Sheet 1

June 24, 1930.  E. W. M. SCOTT ET AL  1,765,887
PROTECTIVE ARRANGEMENT FOR SECTIONALIZED ELECTRIC POWER CIRCUITS
Filed Feb. 27, 1929  4 Sheets-Sheet 2
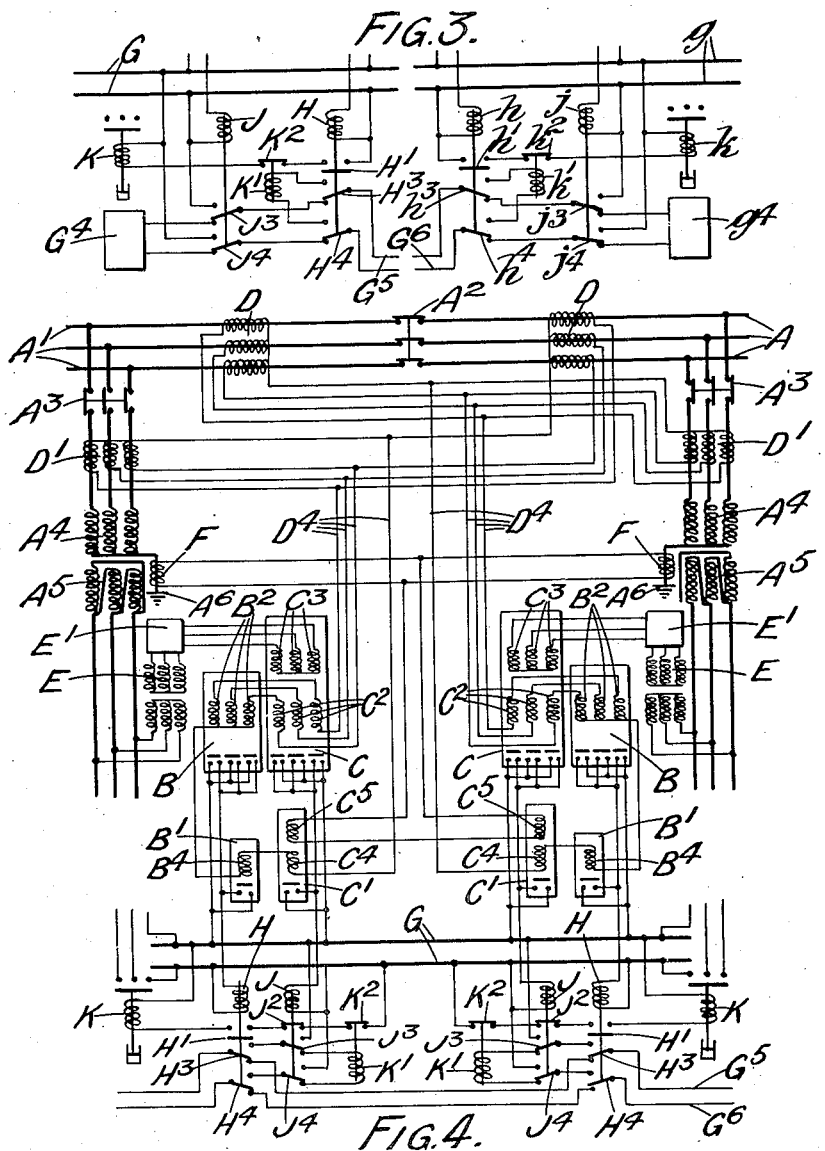

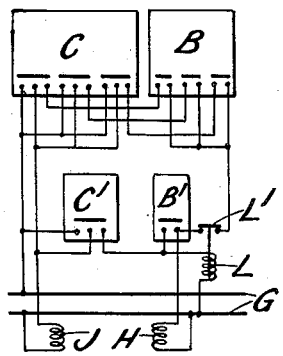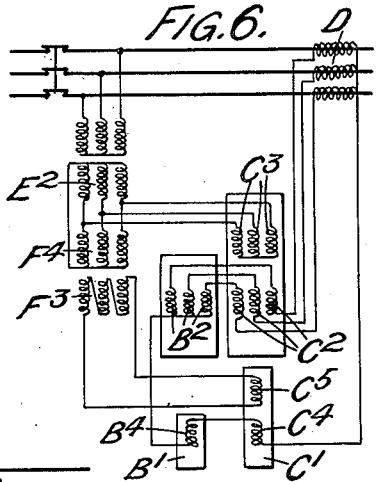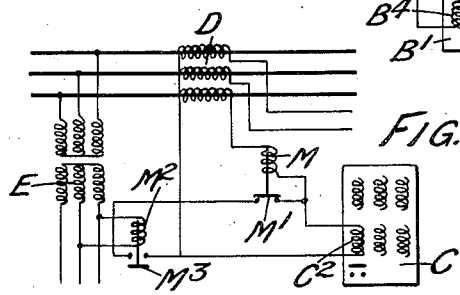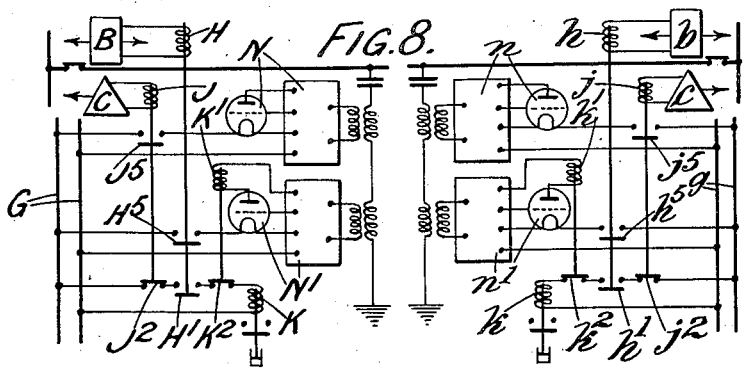

Patented June 24, 1930

1,765,887

UNITED STATES PATENT OFFICE

ERIC WALTER MARBURY SCOTT, OF CHURCH STRETTON, AND BRUCE HAMER LEESON, OF TYNEMOUTH, ENGLAND, ASSIGNORS TO A. REYROLLE & COMPANY LIMITED, OF HEBBURN-ON-TYNE, ENGLAND, A COMPANY OF GREAT BRITAIN

PROTECTIVE ARRANGEMENT FOR SECTIONALIZED ELECTRIC POWER CIRCUITS

Application filed February 27, 1929, Serial No. 343,162, and in Great Britain April 2, 1928.

This invention relates to protective arrangements for sectionalized electric power circuits, and although primarily intended for the protection of sections of high voltage A. C. transmission circuits is generally applicable to electric transmission or distribution circuits whether carrying alternating or direct current. The protective arrangements employed for A. C. circuits are usually of the Merz-Price type in which the current entering a section at one end is balanced against that leaving the section at the other end. Such arrangements, besides requiring accurate calibration of current transformers and other apparatus, usually entail the use of heavily insulated and expensive pilot wires and necessitate the provision of relatively complicated compensating apparatus for preventing inadvertent operation of the protective gear as the result for instance of capacity currents in the pilot circuit more especially in the case of pilot wires of great length.

The present invention has for its object to provide a protective arrangement for the sections of an electric power circuit in which such difficulties and complications are avoided.

In the arrangement according to the invention each section is protected independently of the other sections by means of a protective arrangement comprising a tripping relay device at each end controlling a tripping circuit for a circuit-breaker at the adjacent end of the section, a stabilizing relay device at each end operative on the occurrence of a fault in the system only when the current in the power circuit is flowing out from the section at the end adjacent to the stabilizing relay device, and means whereby each stabilizing relay device when operated causes a stabilizing current to be transmitted to the remote end of the section and thereby prevents the circuit-breaker at the remote end from being opened by its tripping relay device.

Each tripping relay device may be so arranged as to be operative on the occurrence of a fault in the system only when the current in the power circuit is flowing into the section at the end adjacent to the device, but preferably each tripping relay device is operative on the occurrence of a fault irrespective of the direction of flow of current in the protected section. With this arrangement each stabilizing relay device preferably acts to prevent the circuit-breakers at both ends from being opened by their tripping relay devices.

Each stabilizing relay device preferably acts to connect a local source of current to pilot wires connected at the remote end to a lock-out relay associated with the tripping relay device at that end. With this arrangement it will be apparent that the pilot wires need never be called upon to have greater voltage applied to them or to carry greater current than is necessary for the operation of the lock-out relays, and consequently the difficulties and expense attendant upon the use of the pilot wires required in Merz-Price systems are avoided. Preferably the pilot wires which carry the stabilizing currents are normally employed for other purposes such as the transmission of telephonic or supervisory control currents. Alternatively pilot wires may be dispensed with altogether, the stabilizing currents then consisting of or being carried by high frequency currents superimposed on the conductors of the power circuit.

The relay devices may be arranged in various ways. Thus when the invention is applied to a polyphase power circuit, each of the four relay devices on each section may comprise an overload relay or group of overload relays and an earth leakage relay, the overload and earth leakage relays acting in parallel to control the tripping or stabilizing circuits either directly or through an auxiliary relay. These relays are directional in operation in the case of the stabilizing relay devices and also in some instances in the case of the tripping relay devices. The overload relays may have their current coils energized from current transformers in the protected section and their voltage coils energized from potential transformers in the section. In the case of a high voltage transmission circuit, wherein there is a branch circuit T connected to the line through a power transformer at the adjacent end of the section, the potential transformers are preferably connected to the low tension side of the power transformer. The earth leakage relays may also be energized in a similar manner, but when there is an adjacent power transformer the "voltage" coil of the earth leakage relay may be energized from a current transformer in the earthing connection to the neutral point of the high tension winding of the power transformer.

Figure 9:
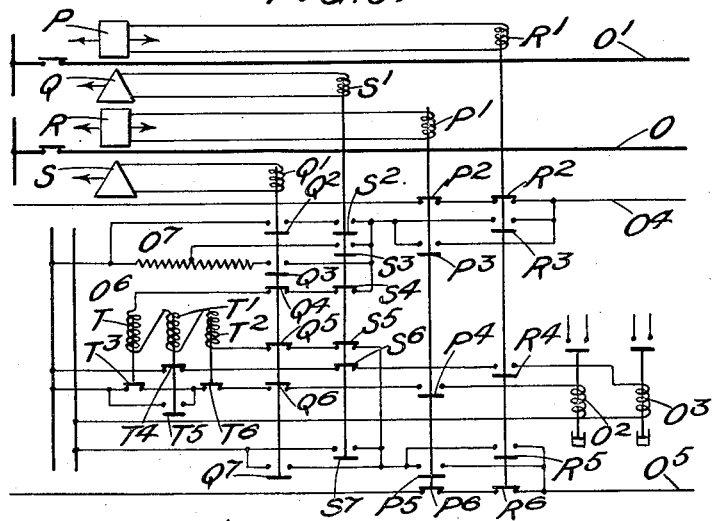
Figure 10:
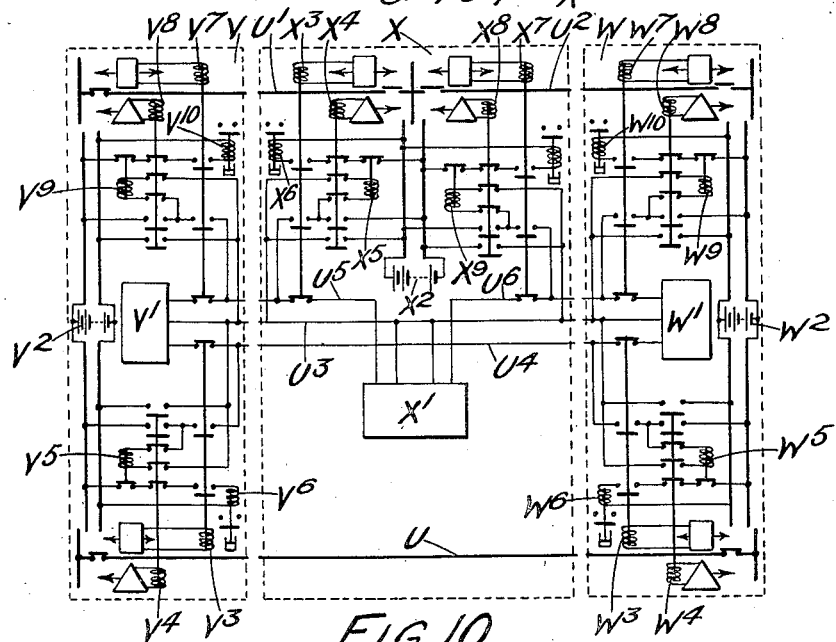

The invention may be carried into practice in various ways but some convenient practical arrangements according thereto are illustrated in the accompanying drawings as applied to a sectionalized high tension three-phase power transmission line (such as a ring main) wherein the sections extend from station to station and are capable of being supplied with power from either end. In these drawings, Figures 1 and 2 show one arrangement, Figure 1 showing the protective relay apparatus at one station, whilst Figure 2 includes part of two adjacent stations and shows the tripping and stabilizing circuits concerned with the protection of the section between the stations, Figure 3 shows a modification of the circuits of Figure 2, Figure 4 is a diagram similar to that of Figure 1 but illustrating a preferred arrangement, Figures 5 to 8 show further modifications of the preceding arrangements, Figure 9 illustrates an application of the invention to the protection of duplicate feeders, and Figure 10 shows an extension of the arrangement of Figure 9 to deal with the case of duplicate feeders, one of which is interrupted at one or more points for supply to intermediate substations.

In cases where a drawing shows two stations one at each end of the protected section, small reference letters are employed for the parts at one station which are similar to the parts at the other station indicated by the corresponding capital letters, and in such cases a description will only be given of the parts at one of the stations.

Figure 2:
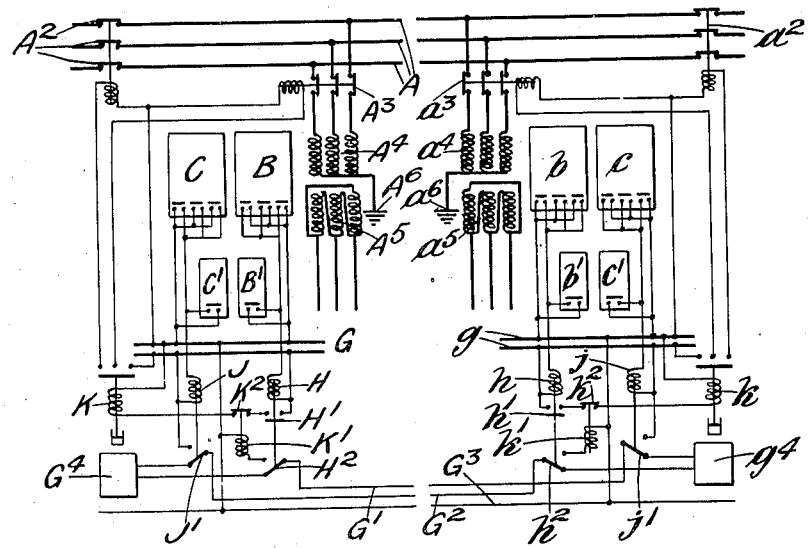

In the arrangement of Figures 1 and 2 the invention is illustrated as applied to the protection of a section A terminating at each end in a duplicate supply substation, of the kind in which the two sections A A¹ adjacent to each substation are connected together through a main circuit-breaker A² and are each connected through a circuit-breaker A³ to the primary A⁴ of a power transformer whose secondary A⁵ supplies a distribution circuit. Each power transformer primary A⁴ is in this instance star-connected with its neutral point earthed at A⁶.

Each substation is provided with four relay devices, two of which are associated with the protection of the section A under consideration, the other two being associated with the adjacent section A¹. The two pairs or relay devices are similar to one another and each comprises a tripping relay device B B¹ and a stabilizing relay device C C¹.

Each tripping device B B¹ comprises a group B of three overload directional relays having current coils B² and voltage coils B³ and an earth leakage directional relay B¹ having a current coil B⁴ and what will be termed a "voltage" coil B⁵ in accordance with usual practice although as will be mentioned later this coil is preferably not energized strictly in accordance with a voltage. The stabilizing relay devices C C¹ are similar to the tripping devices and the corresponding coils are indicated with like index numerals. The energizing circuits for these coils will now be described.

Groups D D¹ of three current transformers, having their secondaries star-connected on one side, are provided at the ends of the sections. Thus conveniently there are two groups D associated respectively with the two sections A A¹ and disposed one on either side of the main circuit-breaker A², whilst two further groups D¹ also associated one with each section are disposed between the power transformers A⁴ A⁵ and the line. The secondaries of the two groups of transformers D D¹ associated with each section are connected to three summation transformers D², so that the secondary windings D³ of the summation transformers apply to the secondary circuits D⁴ E. M. F.'s proportional to the total currents flowing in the respective phases of the section at the adjacent end. The summation transformer secondaries D³, which are connected in star on one side, are each connected on the other side through the current coils B² C² of the overload tripping and stabilizing relays B C in the corresponding phase, the three secondary leads being star-connected on the other sides of the overload relays. The current coils B⁴ C⁴ of the earth leakage tripping and stabilizing relays B¹ C¹ are connected in series with one another between the two star points of these secondary circuits.

The voltage coils B³ C³ of the overload tripping and stabilizing relays B C are energized in parallel from the secondaries E of potential transformers, which are preferably connected on the secondary side of the corresponding power transformer A⁴ A⁵, suitable means indicated at E¹ being provided for compensating for the voltage drop in the power transformer, so that the potential transformer secondary circuits will accurately reflect the voltage conditions on the primary side of the transformer. In order to enable these relays B C to be maintained properly in circuit when one of the two power transformers is out of service, the potential transformer secondary circuits associated with the two power transformers are suitably interconnected through auxiliary switches (such interconnections being omitted from the drawings for the sake of simplicity).

The "voltage" coils $B^5$ $C^5$ of the earth leakage relays $B^1$ $C^1$ may be energized from a suitable potential source, but preferably these coils are energized as shown in series from a current transformer F in the earthing connection $A^6$ to the neutral point of the corresponding power transformer primary $A^4$. To provide for the case when one power transformer is out of service, the two current transformer secondaries F are connected to a summation transformer $F^1$ whose secondary $F^2$ supplies the "voltage" coils $B^5$ $C^5$ of the four earth leakage relays $B^1$ $C^1$. It will be apparent that since the operation of the earth leakage relays $B^1$ $C^1$ is entirely dependent on the direction of flow of the fault current in the power circuit and is independent (except for the limits imposed by the sensitiveness of the relays) of the magnitude of such current, the flow of current through the neutral point earthing connection $A^6$ will provide in a simple and economical manner a satisfactory basis for comparison with the flow of total earth fault current in the section itself, and the arrangement is preferable to the use of a voltage element since it ensures correct discrimination even when there is a heavy fall in voltage due to the fault.

The contacts of the three overload tripping relays B and of the earth leakage tripping relay $B^1$ are connected in parallel with one another to control the energization from a local D. C. source G of a tripping auxiliary relay H, and the contacts of the overload and earth leakage stabilizing relays C $C^1$ similarly control a stabilizing auxiliary relay J.

The two substations at the ends of the section A are connected together through pilot wires, which are normally employed for various purposes such as for example as telephony or the transmission of indicating or controlling or metering currents in a remote control system, and the number and nature of such pilot wires will depend on the uses to which they are normally applied. For the purposes of the protective arrangement of Figures 1 and 2 three of these pilot wires $G^1$ $G^2$ $G^3$ are required and, for convenience of description, it will be assumed that two of these pilot wires $G^1$ $G^2$ which extend between the two substations, are normally employed for telephonic purposes, (the telephone apparatus being indicated at $G^4$) whilst the third $G^3$ is a return pilot extending continuously from station to station and may for instance form part of another telephone circuit. The pilot wires $G^1$ $G^2$ are disconnected, when required for protective purposes, from their normal circuits by the auxiliary relays H J controlled by the overload and earth leakage relays B $B^1$ C $C^1$ in a manner which will now be described.

The tripping auxiliary relay H has two sets of contacts $H^1$ $H^2$, one of which $H^1$ is normally open and controls a circuit from the local battery G to a time-lag relay K which controls tripping circuits for the main circuit-breaker $A^2$ and for the circuit-breaker $A^3$ arranged between the corresponding power transformer and the line. The other contacts $H^2$ are arranged in the form of change-over contacts which normally connect one of the pilot wires $G^1$ to the telephone apparatus $G^4$ but on operation of the relay connect that pilot wire through a lock-out relay $K^1$ to the common return pilot $G^3$. The normally closed contacts $K^2$ of the lock-out relay $K^1$ control the circuit to the time-lag relay K, so that when the local battery $g$ at the other substation is applied across these two pilot wires $G^1$ $G^3$ the lock-out relay $K^1$ will operate to de-energize the time-lag relay K and thus prevent tripping of the circuit-breakers $A^2$ $A^3$. The contacts $J^1$ of the stabilizing auxiliary relay J are arranged as change-over contacts and serve to connect the remaining pilot wire $G^2$ either to the telephone apparatus $G^4$ or after operation of the relay to one pole of the local battery G, the other pole of which is permanently connected to the common return pilot wire $G^3$. Thus the operation of the stabilizing auxiliary relay J will connect the local battery G across the two pilot wires $G^2$ $G^3$ across which the lock-out relay $k^1$ at the remote end can be connected.

The tripping relay devices B $B^1$ $b$ $b^1$ are so arranged that they can only operate when the fault current in the power circuit is flowing into the section A at the adjacent end, and the stabilizing relay devices C $C^1$ $c$ $c^1$ are arranged to operate only when the current is flowing out of the section A at the adjacent end.

Under normal conditions all the relays are inoperative and the pilot wires $G^1$ $G^2$ are connected to the telephone apparatus $G^4$ $g^4$ for use when required. If now a fault occurs at a point external to the section A under consideration, a heavy current of relatively short duration will flow through the section from end to end in one direction. This will cause the operation of one or more of the tripping relays B $B^1$ at one end (namely that at which the current is entering the section) and of the corresponding stabilizing relays $c$ $c^1$ at the remote end of the section, the other relays remaining inoperative. The operation of the tripping auxiliary relay H at the first end will complete the circuit to its time-lag relay K and will disconnect one pilot wire G¹ from the telephone apparatus G⁴ and connect the lock-out relay K¹ between this pilot wire G¹ and the common return pilot wire G³. At the other end of the section the operation of the stabilizing auxiliary relay j will disconnect the telephone apparatus g⁴ from the same pilot wire G¹ and will connect the local battery g across the two pilot wires G¹ G³, thus energizing the lock-out relay K¹ at the first end. This lock-out relay K¹ is thus operated to deenergize the time-lag relay K and the system will consequently remain stable. As soon as the fault is cleared, the relays will reset themselves and reestablish the normal telephone circuit.

If on the other hand a fault occurs in the section A itself, current will flow from both ends of the section inwards towards the fault. Thus the tripping overload or earth leakage relays B B¹ b b¹ (according to whether the fault is between phases or to earth) at both ends of the section will be operated, whilst the stabilizing relays C C¹ c c¹ at both ends will remain inoperative. The tripping auxiliary relays H h at both ends will operate their contacts and energize their time-lag relays K k, disconnecting the telephone apparatus G⁴ g⁴ from the pilot wires G¹ G² and connecting the lock-out relays K¹ k¹ in circuit. Since however neither stabilizing auxiliary relay J j is operated, both lock-out relays will remain deenergized, and the time-lag relays K k will consequently complete their operation and trip out the four circuit-breakers A² A³ a² a³ at the ends of the section, the supply to the two substations concerned, however, still being maintained through the power transformers connected to the adjacent healthy sections. The relays then reset themselves to reestablish the normal telephone circuit. It will be noticed that telephone communication over the pilot wires G¹ G² is only interrupted during the brief period between the first operation of the relays and the moment of clearing of the fault, the time taken for clearing a fault being the same whatever the position of the fault on the system.

Since, in the case of earth faults, the operation of the earth leakage relays is dependent on the flow of fault current through the neutral point earthing connections instead of on the voltage, these relays will operate whatever the value of the voltage and correct discrimination will always be obtained. In the case of interphase faults a heavy fall in voltage may leave the overload relays unaffected but since the stabilizing relays adjacent to the inoperative tripping relays will also not operate, the effect in such a case would be to trip out the next section of the line, thereby effectively clearing the fault. Such a contingency is however unlikely to occur, especially in the case of an overhead line system where the majority of faults would be earth faults.

In the event of simultaneous earth faults on two sections of the line, the earth fault currents will in one faulty section flow in the same direction at both ends whilst feeding the second fault. The second faulty section will however in this case be cut out in the normal manner, and the relays on the first faulty section will then operate, so that both faults will be cleared.

The above arrangement may be modified in various ways. Thus if four pilot wires are available between two substations, one pair may be used for the transmission of stabilizing currents from one substation to the lock-out relay at the second, whilst the stabilizing currents can be transmitted from the second substation to the lock-out relay at the first over the other pair of pilot wires. By rearranging the contacts on the auxiliary relays it is also possible to carry out the necessary operations with the use of two pilot wires only, and such an arrangement is illustrated in Figure 3 which shows a modified form of the lower part of Figure 2 (the same reference letters being employed where applicable).

In the arrangement of Figure 3 the tripping auxiliary relay H has three sets of contacts H¹ H³ H⁴, one H¹ normally open controlling the circuit to the time-lag tripping relay K as before and the other two H³ H⁴ in the form of change-over contacts which normally connect the two pilot wires G⁵ G⁶ to the contact arms J³ J⁴ of change-over contacts on the stabilizing auxiliary relay J, but after operation of the tripping auxiliary relay connect these pilot wires to the lock-out relay K¹ controlling the circuit to the time-lag relay K. The stabilizing auxiliary relay change-over contacts J² J³ normally complete the telephone or other circuits but after operation of the relay the two contact arms are connected across the local battery G. Thus when a fault occurs external to the protected section the stabilizing auxiliary relay J at one end and the tripping auxiliary relay h at the other end operate, so that in addition to the breaking of the telephone circuits a circuit is established from the local battery G at the stabilizing end over the pilot wires G⁵ G⁶ to the lock-out relay k¹ at the other end, the result being that the section is left in circuit at both ends. For an internal fault neither stabilizing auxiliary relay J j operates but both tripping auxiliary relays H h operate so that the feeder is cut out at both ends.

Figure 4 shows a modification in which each tripping relay device is so arranged as to be operative on the occurrence of a fault in the system irrespectitve of the direction of flow of current in the protected section. This arrangement is in many respects identical with that of Figure 1 and the same reference letters are employed where applicable, the arrangement only being described in so far as it differs from that of Figure 1.

The tripping and stabilizing relay devices B B$^1$ C C$^1$ are arranged as before, with the exception that the tripping relay devices B B$^1$ no longer have directional properties and their voltage coils B$^3$ B$^5$ are consequently omitted. Figure 4 shows certain small modifications in the energizing circuits to the various relay coils (these modifications however being equally applicable to the arrangement of Figure 1). Thus the circuit-breaker A$^2$ is itself included within the scope of the protection afforded to each section A A$^1$ and consequently the current transformers D$^1$ in each T-connected circuit cooperate with the current transformers D on the remote side of the circuit-breaker A$^2$ instead of with those on the near side. Again the summation transformers D$^2$ are omitted, the secondaries of the transformers D D$^1$ being directly connected together and to the relay energizing conductors D$^4$. The summation transformer F$^1$ is similarly omitted. The provision of summation transformers as in Figure 1 will however usually be desirable if the current transformers D and D$^1$ have different ratios or different secondary outputs.

The circuit controlled by the tripping and stabilizing auxiliary relays H J are generally similar to those of Figure 3, the same reference letters being employed where applicable. Thus each tripping auxiliary relay H has three sets of contacts H$^1$ H$^3$ H$^4$, of which the first H$^1$ controls the circuit to the time-lag relay K, whilst the other two H$^3$ H$^4$ are arranged as change-over contacts and normally connect up the pilot wires G$^5$ G$^6$ to form part of the telephone or other circuits (here shown as remote control circuits) but after operation connect the pilot wires to the lock-out relay K$^1$. These circuits however are in this arrangement also controlled by the stabilizing auxiliary relay J. This relay J has a further set of normally closed contacts J$^2$ which are in series with the contacts H$^1$ and K$^2$ in the energizing circuit to the time-lag relay K, whilst its change-over contacts J$^3$ J$^4$ normally complete the circuit to the lock-out relay K$^1$ instead of the remote control or other circuits, these contacts J$^3$ J$^4$ after operation connecting the battery G across the pilot wires G$^5$ G$^6$ as before.

Thus under normal conditions all the relays are inoperative and the pilot wires are connected to form part of the remote control circuits. If now a fault occurs at a point external to the section under consideration, a heavy current of relatively short duration will flow through the section A from end to end in one direction. This will cause the operation of one or more of the tripping relays B B$^1$ at both ends of the section and also of the corresponding stabilizing relays C C$^1$ at the end at which the fault current is flowing out from the feeder. The stabilizing auxiliary relay J at this end will break the circuit to the time-lag tripping relay K and thus prevent operation of the adjacent circuit-breakers A$^2$ A$^3$, and will also connect its battery G over the pilot wires G$^5$ G$^6$ through the change-over contacts H$^3$ H$^4$ of the tripping auxiliary relays H at both ends to the lock-out relay K$^1$ at the other end, which breaks the circuit to the time-lag relay K at that end, this time-lag relay having started to operate when the tripping auxiliary relay H had operated but being locked out before its operation is completed. Thus the operation of the stabilizing auxiliary relay J at one end prevents opening of the circuit-breakers at both ends. The first operation of the two tripping auxiliary relays H breaks the normal remote control circuit, but this circuit is reestablished by the resetting of the relays as soon as the fault is cleared.

If on the other hand a fault occurs in the section A itself, current will flow from both ends of the section inwards towards the fault. Thus the tripping overload or earth leakage relays B B$^1$ (according to whether the fault is between phases or to earth) at both ends of the section will be operated, whilst the stabilizing relays C C$^1$ at both ends will remain inoperative. The tripping auxiliary relays H at both ends will therefore break the remote control circuit and energize their time-lag relays K, the lock-out relays K$^1$ at the two ends being connected together over a deenergized pilot circuit and consequently remaining inoperative. The time-lag relays K will thus complete their operation and trip out the four circuit-breakers A$^2$ A$^5$ at the ends of the section, the supply to the two substations concerned, however, being maintained through the power transformers connected to the two healthy sections. The relays then reset themselves to reestablish the normal remote control circuit, which has been interrupted only during the brief period between the first operation of the relays and the moment of clearing the fault, the time taken for clearing a fault being the same whatever the position of the fault on the system.

With this arrangement, as also in the preceding arrangements when for example the pilot wires are normally used for remote control purposes, it may be desirable in the case when the remote control circuits carry D. C. currents to polarize one or both of the lock-out relays in order to prevent incorrect stabilization occurring as the result of operation of a lock-out relay by the remote control currents.

Figure 5 illustrates a modification of the above arrangements for the purpose of insuring satisfactory operation in the event of simultaneous earth faults on different phases of different sections of the network. In the previous arrangements there is risk of incorrect operation in such an event if it should happen that the two earth faults are fed in opposite directions through a part of the line intermediate between the faults, this operation occurring as the result of the operation of the overload relays dealing with interphase faults. This disability can be overcome by utilizing the fact that under such unusual circumstances there is always a residual current sufficient to operate the earth leakage relays. Thus if the earth leakage relays are so arranged that when they operate they render the tripping overload relays ineffective, the desired result will be obtained. One convenient arrangement to this end is shown in Figure 5 in which the supply to the tripping auxiliary relay H is controlled by both earth leakage relays $B^1$ $C^1$, but its operation from the overload relays B C is controlled by the normally closed contacts $L^1$ of an auxiliary relay L, which is operated whenever either earth leakage relay $B^1$ or $C^1$ operates. The stabilizing auxiliary relay J is directly controlled as before by the stabilizing overload and earth leakage relays C $C^1$. Thus an earth fault automatically takes precedence over an interphase fault and correct operation is insured.

In the arrangements above described, the "voltage" coil of each directional earth leakage relay has been referred to as energized from a current transformer in the neutral point earthing connection of a power transformer. Figure 6 shows a convenient arrangement for energizing this "voltage coil" when there is no neutral point earthing connection available, this arrangement being illustrated by way of example in its application to the arrangement of Figure 4, the same reference letters being employed where applicable.

In the arrangement of Figure 6, the "voltage" coil $C^5$ is energized from the open-delta-connected secondary $F^3$ of an auxiliary potential transformer whose primary $F^4$ is supplied from the secondary $E^2$ of the main potential transformer from which the voltage coils $C^3$ of the interphase fault overload directional relays C are energized, this main potential transformer being connected up in the well-known manner. With this arrangement it will be appreciated that the earth leakage voltage coils $C^5$ are normally deenergized but become energized on the occurrence of an earth fault by a potential in phase with the voltage in the faulty phase. Although illustrated only with respect to the arrangement of Figure 4, this arrangement is also applicable to the arrangement of Figure 1, in which case the secondary $F^3$ will supply the voltage coils $B^5$ $C^5$ of the tripping and stabilizing earth leakage relays $B^1$ $C^1$ in series.

Figure 7 shows another modification of the energizing circuits of the overload relays. Under certain circumstances of light load on a power system the short-circuit current on fault is limited to a value below the normal full-load value, and Figure 7 shows a convenient arrangement for ensuring operation of the overload relays (say, the relays C) under such conditions but yet preventing operation under normal full-load conditions. For this purpose the operating coil of a non-directional overload relay or (as shown) the current coil $C^2$ of a directional overload relay C is under normal full-load conditions short-circuited by the contacts $M^1$ $M^3$ of an auxiliary overload relay M and of an auxiliary low-volt relay $M^2$, and the operation of the relay C will therefore be dependent upon the setting of the auxiliary overload relay M. If the voltage falls below a predetermined value the auxiliary low-volt relay $M^2$ opens its contacts $M^3$ and thus renders the relay C operative. The relay C is thus put into circuit either on excessive rise of current or on excessive fall of voltage. In effect this is equivalent to providing the relay C with two settings, the choice of which is determined in accordance with the voltage conditions.

The above arrangements may be modified in various ways. Thus for instance alternating currents instead of direct currents may be transmitted over the pilot wires for stabilizing purposes, or pilot wires may be dispensed with altogether by the use of high frequency currents superimposed on one or more of the power conductors. One convenient superimposed current arrangement is illustrated by way of example in Figure 8, the arrangement shown being analogous to that of Figure 4.

In the arrangement of Figure 8 the tripping and stabilizing relay devices (diagrammatically indicated at B and C) are arranged as in Figure 4 and control the tripping and stabilizing auxiliary relays H J. The stabilizing auxiliary relay acts at contacts $J^5$ to connect up a high frequency generator indicated at N, so that it can transmit high frequency currents through suitable coupling devices over one or more of the power circuit conductors. The lock-out relay $K^1$ is operated by a suitably tuned receiver indicated at $N^2$, which is connected up by the operation of the contacts $H^5$ of the tripping auxiliary relay H. The time-delay relay K is as before controlled by the contacts $J^2$ $H^1$ $K^2$ of the stabilizing auxiliary relay J, the tripping auxiliary relay H and the lock-out relay $K^1$.

Alternatively if superimposed high frequency currents are already being utilized for other purposes, the stabilizing auxiliary relays may act to modulate such currents at chosen modulation frequencies to which the appropriate lock-out relays are sensitive.

A still further application of the invention is to the discriminate protection over two pilot wires of duplicate feeders. Figure 9 shows a convenient arrangement to this end, which will be described by way of example with reference to the arrangement of Figure 4. In this arrangement each of the two feeders O $O^1$ is provided with tripping and stabilizing relay devices P Q or R S controlling auxiliary relays $R^1$ $S^1$ and $P^1$ $Q^1$ respectively and the desired discrimination is obtained by varying the amount of stabilizing current allowed to flow through the lock-out relays, of which three T $T^1$ $T^2$ are employed in series in place of each lock-out relay in the previous arrangements. The three lock-out relays have different current settings, for example, in the proportion of 1:2:4. The first lock-out relay T with the lowest setting stabilizes the first feeder O by breaking at contacts $T^3$ the circuit to the time-lag relay $O^2$ associated with the feeder O. The second lock-out relay $T^1$ with the intermediate setting stabilizes the second feeder $O^1$ by breaking at contacts $T^4$ the circuit to the time-lag relay $O^3$ of the second feeder $O^1$ and also remakes at contacts $T^5$ the circuit to the time-lag relay $O^2$ of the first feeder O. The third lock-out relay $T^2$ with the highest setting stabilizes both feeders O $O^1$ by breaking at contacts $T^6$ the circuit to the time-lag relay $O^2$ leaving the circuit to the time-lag relay $O^3$ broken by the second lock-out relay at contacts $T^4$.

The tripping auxiliary relays $P^1$ $R^1$ each have five sets of contacts. The normally closed contacts $P^2$ $R^2$ in series control the connection of one of the two pilot wires $O^4$ in its normal remote control or other circuit and the other pilot wire $O^5$ is similarly connected in its normal circuit by the contacts $P^6$ $R^6$. The normally open contacts $P^4$ and $R^4$ respectively control the energizing circuits of the time-lag relays $O^2$ and $O^3$, and the remaining normally open contacts $P^3$ $R^3$ $P^5$ $R^5$ control the connections of the pilot wires $O^4$ $O^5$ to contacts on the stabilizing auxiliary relays $Q^1$ $S^1$, each of which has six sets of contacts. The normally closed contacts $Q^6$ and $S^6$ respectively control the circuits to the time-lag relays $O^2$ and $O^3$, and the normally closed contacts $Q^4$ $Q^5$ $S^4$ $S^5$ control the connections from the pilot wires $O^4$ $O^5$ to the lock-out relays T $T^1$ $T^2$ through the contacts $P^3$ $R^3$ $P^5$ $R^5$. The normally open contacts $Q^7$ $S^7$ control a direct connection through the contacts $P^5$ $R^5$ from the pilot wire $O^5$ to one pole of the local battery $O^6$, the other pole of which is connected through a graded limiting resistance $O^7$ to the pilot wire $O^4$ under the control of the contacts $P^3$ $R^3$ and the contacts $Q^2$ $Q^3$ $S^2$ $S^3$. Thus the stabilizing auxiliary relay $Q^1$ for the first feeder O closes contacts $Q^3$ to insert the whole of the resistance $O^7$ in circuit, and the relay $S^1$ for the second feeder $O^1$ closes contacts $S^3$ to insert a portion of the resistance $O^7$, whilst simultaneous operation of both stabilizing auxiliary relays $Q^1$ $S^1$ closes contacts $Q^2$ $S^2$ and cuts out the resistance $O^7$ altogether. It will thus be clear that the operation of one or both stabilizing relays ensures the operation of the appropriate lock-out relay at the remote end, so that if a fault occurs on one feeder the faulty feeder is cut out and the healthy feeder left in circuit whilst if the fault is external to the feeders both feeders are left in circuit.

This arrangement may be modified in various ways, for example by obtaining discriminative operation of the lock-out relays by means of two equal D. C. currents of opposite polarity and a third current of different magnitude or by means of three A. C. currents of different frequencies.

These arrangements have an advantage over known protective arrangements for duplicate feeders, in that they are operative whether the two feeders are connected in parallel or not. Indeed the feeders may be entirely independent of one another and may even carry different voltages. These arrangements however fail to operate satisfactorily in the unusual event of the two feeders being connected up in series with one another so as to constitute a connection between two busbar sections in the same station. This disability can however be overcome by employing three pilot wires instead of two, so that each feeder is protected by one pilot wire and a common return pilot wire, or in other ways.

The arrangement may also be extended to deal with the case of duplicate feeders, one of which is broken at one or more points for supply to intermediate substations.

Such an arrangement is shown in Figure 10 for the case of two feeders, one of which U extends between two stations V and W whilst the other $U^1$ $U^2$ is broken at a single intermediate station X. Three pilot wires are employed, one of which $U^3$ serves as a common return circuit, and another $U^4$ serves in combination with the return pilot $U^3$ for stabilizing the unbroken feeder U, whilst the third is formed in two parts $U^5$ $U^6$ respectively cooperating with the return pilot $U^3$ for stabilizing the parts $U^1$ $U^2$ of the broken feeder. In the example illustrated, these pilot wires are shown as normally employed for telephonic purposes, the telephone apparatus being indicated at $V^1 W^1 X^1$. Each station has a local battery $V^2$ or $W^2$ or $X^2$, the connections being such that the direction of stabilizing current flow in the return pilot $U^3$ is the same for all cases. For the protection of the feeder U, the station V is provided with a tripping auxiliary relay $V^3$, a stabilizing auxiliary relay $V^4$, a lock-out relay $V^5$ and a time-delay relay $V^6$, similar apparatus $W^3 W^4 W^5 W^6$ being provided in the station W. For the protection of the feeder section $U^1$ the station V is provided with a similar group of four relays $V^7 V^8 V^9 V^{10}$ and the intermediate station with another group of relays $X^3 X^4 X^5 X^6$, whilst further similar groups of relays $W^7 W^8 W^9 W^{10}$ and $X^7 X^8 X^9 X^{10}$ are provided respectively at the stations W and X for the protection of the feeder section $U^2$. The manner of operation of these relays will be clear without further description from the descriptions of the other arrangements above given, the circuits actually shown being similar to those of Figure 4.

The arrangements above described may be modified where necessary to suit the type of circuit to be protected. Thus for example the arrangement may be applied with slight modification to the protection of a section between two substations of the kind in which the incoming and outgoing sections are connected to one or more sets of busbars, to which any desired number of power transformers or other apparatus can be connected. The invention may also be applied to the protection of busbars or of electrical apparatus, such as transformers or motor generators or other machines. For the protection of D. C. circuits or apparatus polarized tripping and stabilizing relays either directly connected in the protected circuit or energized from shunts therein may be employed, the general arrangement of such relays depending on the nature of the circuit to be protected.

What we claim as our invention and desire to secure by Letters Patent is:—

1. The combination with a sectionalized electric power circuit, of circuit-breakers for isolating the sections of the power circuit from one another, a tripping circuit for each circuit-breaker, and means for protecting each section independently of the other sections comprising a tripping relay device at each end controlling the tripping circuit for the adjacent circuit-breaker, a stabilizing relay device at each end operative on the occurrence of a fault on the system only when the current in the power circuit is flowing out from the section at the end adjacent to the stabilizing relay device, means whereby each stabilizing relay device when operated causes a stabilizing current to be transmitted to the remote end of the section and means at each end operated by the stabilizing current from the remote end to prevent the adjacent circuit-breaker from being opened by its tripping relay device.

2. The combination with a sectionalized electric power circuit, of circuit-breakers for isolating the sections of the power circuit from one another, a tripping circuit for each circuit-breaker, and means for protecting each section independently of the other sections comprising a tripping relay device at each end controlling the tripping circuit for the adjacent circuit-breaker and operative on the occurrence of a fault in the system irrespective of the direction of current flow in the protected section, a stabilizing relay device at each end operative on the occurrence of a fault on the system only when the current in the power circuit is flowing out from the section at the end adjacent to the stabilizing relay device, means whereby each stabilizing relay device when operated causes a stabilizing current to be transmitted to the remote end of the section and means at each end operated by the stabilizing current from the remote end to prevent the adjacent circuit-breaker from being opened by its tripping relay device.

3. The combination with a sectionalized electric power circuit, of circuit-breakers for isolating the sections of the power circuit from one another, a tripping circuit for each circuit-breaker, and means for protecting each section independently of the other sections comprising a tripping relay device at each end controlling the tripping circuit for the adjacent circuit-breaker and operative on the occurrence of a fault in the system irrespective of the direction of current flow in the protected section, a stabilizing relay device at each end operative on the occurrence of a fault in the system only when the current in the power circuit is flowing out from the section at the end adjacent to the stabilizing relay device, means whereby each stabilizing relay device when operated acts to prevent the adjacent circuit-breaker from being opened by its tripping relay device and to cause a stabilizing current to be transmitted to the remote end of the section and means at each end operated by the stabilizing current from the remote end to prevent the adjacent circuit-breaker from being opened by its tripping relay device.

4. The combination with a sectionalized electric power circuit, of circuit-breakers for isolating the sections of the power circuit from one another, a tripping circuit for each circuit-breaker, and means for protecting each section independently of the other sections comprising a tripping relay device at each end controlling the tripping circuit for the adjacent circuit-breaker, a stabilizing relay device at each end operative on the occurrence of a fault on the system only when the current in the power circuit is flowing out from the section at the end adjacent to the stabilizing relay device, a lock-out relay at each end acting when operated to prevent the adjacent circuit-breaker from being opened by its tripping relay device, and means whereby each stabilizing relay device when operated causes a stabilizing current to be transmitted to the remote end of the section for the operation of the lock-out relay at that end.

5. The combination with a sectionalized electric power circuit, of circuit-breakers for isolating the sections of the power circuit from one another, a tripping circuit for each circuit-breaker, and means for protecting each section independently of the other sections comprising a tripping relay device at each end controlling the tripping circuit for the adjacent circuit-breaker and operative on the occurrence of a fault in the system irrespective of the direction of current flow in the protected section, a lock-out relay at each end acting when operated to prevent the adjacent circuit-breaker from being opened by its tripping relay device, a stabilizing relay device at each end operative on the occurrence of a fault in the system only when the current in the power circuit is flowing out from the section at the end adjacent to the stabilizing relay device, and means whereby each stabilizing relay device when operated acts to prevent the adjacent circuit-breaker from being opened by its tripping relay device and causes a stabilizing current to be transmitted to the remote end of the section for the operation of the lock-out relay at that end.

6. The combination with a sectionalized electric power circuit, of circuit-breakers for isolating the sections of the power circuit from one another, a tripping circuit for each circuit-breaker, and means for protecting each section independently of the other sections comprising a time-lag relay at each end controlling the tripping circuit for the adjacent circuit-breaker, means operative on the occurrence of a fault on the system for energizing the time-lag relays, a lock-out relay at each end acting when operated to break the energizing circuit to the adjacent time-lag relay, a stabilizing relay device at each end operative on the occurrence of a fault in the system only when the current in the power circuit is flowing out from the section at the end adjacent to the stabilizing relay device, and means whereby each stabilizing relay device when operated causes a current to be transmitted to the remote end of the section for the operation of the lock-out relay at that end.

7. The combination with a sectionalized electric power circuit, of circuit-breakers for isolating the sections of the power circuit from one another, a tripping circuit for each circuit-breaker, and means for protecting each section independently of the other sections comprising a time-lag relay at each end controlling the tripping circuit for the adjacent circuit-breaker, a tripping relay device at each end operative to energize the adjacent time-lag relay on the occurrence of a fault on the system irrespective of the direction of current flow in the protected section, a lock-out relay at each end acting when operated to break the energizing circuit to the adjacent time-lag relay, a stabilizing relay device at each end operative on the occurrence of a fault in the system only when the current in the power circuit is flowing out from the section at the end adjacent to the stabilizing relay device, and means whereby each stabilizing relay device acts when operated to break the energizing circuit to the adjacent time-lag relay and to cause a stabilizing current to be transmitted to the remote end of the section for the operation of the lock-out relay at that end.

8. The combination with a sectionalized electric power circuit, of circuit-breakers for isolating the sections of the power circuit from one another, a tripping circuit for each circuit-breaker, and means for protecting each section independently of the other sections comprising pilot wires extending from one end of the section to the other, a local source of current at each end, a tripping relay device at each end controlling the tripping circuit for the adjacent circuit-breaker, a lock-out relay at each end acting when operated to prevent the adjacent circuit-breaker from being opened by its tripping relay device, a stabilizing relay device at each end operative on the occurrence of a fault on the system only when the current in the power circuit is flowing out from the section at the end adjacent to the stabilizing relay device, and means whereby each stabilizing relay device when operated acts to connect the adjacent source of current to the pilot wires for the energization of the lock-out relay at the remote end.

9. The combination with a sectionalized electric power circuit, of circuit-breakers for isolating the sections of the power circuit from one another, a tripping circuit for each circuit-breaker, and means for protecting each section independently of the other sections comprising pilot wires extending from one end of the section to the other, a local source of current at each end, a tripping relay device at each end controlling the tripping circuit for the adjacent circuit-breaker and operative on the occurrence of a fault on the system irrespective of the direction of current flow in the protected section, a lock-out relay at each end acting when operated to prevent the adjacent circuit-breaker from being opened by its tripping relay device, a stabilizing relay device at each end operative on the occurrence of a fault on the system only when the current in the power circuit is flowing out from the section at the end adjacent to the stabilizing relay device, and means whereby each stabilizing relay device when operated acts to prevent the adjacent circuit-breaker from being opened by its tripping relay device and also to connect the adjacent source of current to the pilot wires for the energization of the lock-out relay at the remote end.

10. The combination with a sectionalized electric power circuit, of circuit-breakers for isolating the sections of the power circuit from one another, a tripping circuit for each circuit-breaker, and means for protecting each section independently of the other sections comprising pilot wires extending from one end of the section to the other, a local source of current at each end, a time-lag relay at each end controlling the tripping circuit for the adjacent circuit-breaker, means operative on the occurrence of a fault on the system for energizing the time-lag relays, a lock-out relay at each end acting when operated to break the energizing circuit to the adjacent time-lag relay, a stabilizing relay device at each end operative on the occurrence of a fault in the system only when the current in the power circuit is flowing out from the section at the end adjacent to the stabilizing relay device, and means whereby each stabilizing relay device when operated acts to break the energizing circuit to the adjacent time-lag relay and to connect the adjacent source of current to the pilot wires for the energization of the lock-out relay at the remote end.

11. The combination with a sectionalized electric power circuit, of circuit-breakers for isolating the sections of the power circuit from one another, a tripping circuit for each circuit-breaker, and means for protecting each section independently of the other sections comprising pilot wires extending from one end of the section to the other and normally being utilized for purposes other than protective purposes, a tripping relay device at each end controlling the tripping circuit for the adjacent circuit-breaker, a stabilizing relay device at each end operative on the occurrence of a fault on the system only when the current in the power circuit is flowing out from the section at the end adjacent to the stabilizing relay device, means operative on the occurrence of a fault on the system for transferring the connections of the pilot wires from their normal condition into a condition in which they can be utilized for the transmission of stabilizing currents, means whereby each stabilizing relay device when operated causes a stabilizing current to be transmitted to the remote end and means at each end operated by the stabilizing current from the remote end to prevent the adjacent circuit-breaker from being opened by its tripping relay device.

12. The combination with a sectionalized electric power circuit, of circuit-breakers for isolating the sections of the power circuit from one another, a tripping circuit for each circuit-breaker, and means for protecting each section independently of the other sections comprising two pilot wires extending from one end of the section to the other and normally being utilized for purposes other than protective purposes, a local source of current at each end, a tripping relay device at each end controlling the tripping circuit for the adjacent circuit-breaker and operative on the occurrence of a fault in the system irrespective of the direction of current flow in the protected section, a lock-out relay at each end acting when operated to prevent the adjacent circuit-breaker from being opened by its tripping relay device, a stabilizing relay device at each end operative on the occurrence of a fault in the system only when the current in the power circuit is flowing out from the protected section at the end adjacent to the stabilizing relay device, means whereby the tripping relay devices act when operated to disconnect the pilot wires from their normal connections and to connect them to the lock-out relays, and means whereby either stabilizing relay device when operated acts to prevent the adjacent circuit-breaker from being opened by its tripping relay device and also to transfer the connections of the pilot wires from the adjacent lock-out relay to the adjacent source of current whereby the lock-out relay at the remote end is operated.

13. The combination with a sectionalized electric power circuit, of circuit-breakers for isolating the sections of the power circuit from one another, a tripping circuit for each circuit-breaker, and means for protecting each section independently of the other sections comprising a tripping relay device at each end consisting of an earth-leakage relay and at least one overload relay such device being operative on the occurrence of an earth or interphase fault on the system to control the tripping circuit for the adjacent circuit-breaker, a stabilizing relay device at each end operative on the occurrence of a fault on the system only when the current in the power circuit is flowing out from the section at the end adjacent to the stabilizing relay device, means whereby each stabilizing relay device when operated causes a stabilizing current to be transmitted to the remote end of the section and means at each end operated by the stabilizing current from the remote end to prevent the adjacent circuit-breaker from being opened by its tripping relay device.

14. The combination with a sectionalized electric power circuit, of circuit-breakers for isolating the sections of the power circuit from one another, a tripping circuit for each circuit-breaker, and means for protecting each section independently of the other sections comprising a tripping relay device at each end consisting of an earth-leakage relay and at least one overload relay such tripping relay device being operative on the occurrence of an earth or interphase fault on the system irrespective of the direction of current flow in the protected section to control the tripping circuit for the adjacent circuit-breaker, a stabilizing relay device at each end consisting of a directional earth-leakage relay and at least one directional overload relay such stabilizing relay device being operative on the occurrence of an earth or interphase fault on the system only when the fault current in the power circuit is flowing out from the protected section at the end adjacent to the stabilizing relay device, and means whereby each stabilizing relay device when operated acts to prevent the circuit-breakers at both ends of the section from being opened by their tripping relay devices.

15. The combination with a sectionalized electric power circuit, of circuit-breakers for isolating the sections of the power circuit from one another, a tripping circuit for each circuit-breaker, and means for protecting each section independently of the other sections comprising a time-lag relay at each end controlling the tripping circuit for the adjacent circuit-breaker, a tripping relay device at each end consisting of an earth-leakage relay and at least one overload relay such tripping relay device being operative on the occurrence of an earth or interphase fault on the system irrespective of the direction of current flow in the protected section, a tripping auxiliary relay at each end which is energized by the operation of any one of the relays of the adjacent tripping relay device and acts to energize the adjacent time-lag relay, a lock-out relay at each end acting when operated to break the energizing circuit to the adjacent time-lag relay, a stabilizing relay device at each end consisting of a directional earth-leakage relay and at least one directional overload relay such stabilizing relay device being operative on the occurrence of an earth or interphase fault in the system only when the fault current in the power circuit is flowing out from the protected section at the end adjacent to the stabilizing relay device, and a stabilizing auxiliary relay at each end which is energized by the operation of any one of the relays of the adjacent stabilizing relay device and acts to break the energizing circuit to the adjacent time-lag relay and to cause a stabilizing current to be transmitted to the remote end of the section for the operation of the lock-out relay at that end.

In testimony whereof we have signed our names to this specification.

ERIC WALTER MARBURY SCOTT.
BRUCE HAMER LEESON.